United States Patent [19]

Lupton et al.

[11] 3,944,536
[45] Mar. 16, 1976

[54] EXCEPTIONALLY RIGID AND TOUGH ULTRAHIGH MOLECULAR WEIGHT LINEAR POLYETHYLENE

[75] Inventors: John Madison Lupton, Wilmington, Del.; James Williams Regester, Aston, Pa.

[73] Assignee: E. I. Du Pont de Nemours & Company, Wilmington, Del.

[22] Filed: June 18, 1973

[21] Appl. No.: 370,715

[52] U.S. Cl..... 260/94.9 R; 260/94.9 GD; 264/331; 428/364; 215/1 C
[51] Int. Cl.².. C08F 14/00; B29J 1/00; C08F 10/02
[58] Field of Search 260/94.9 R, 94.9 GC, 94.9 GD; 264/331; 215/1 C

[56] References Cited
UNITED STATES PATENTS

| | | | |
|---|---|---|---|
| 3,024,211 | 3/1962 | Daly | 260/94.9 GD X |
| 3,026,570 | 3/1962 | Beck et al. | 260/94.9 GD X |
| 3,382,220 | 5/1968 | Bowman, Jr. et al. | 260/94.9 GD X |
| 3,412,080 | 11/1968 | Smith et al. | 260/94.9 GC |
| 3,665,068 | 5/1972 | Duling et al. | 260/94.9 GD X |
| 3,847,888 | 11/1974 | Baumgaertner | 260/94.9 GD |

FOREIGN PATENTS OR APPLICATIONS

| | | | |
|---|---|---|---|
| 858,674 | 1/1961 | United Kingdom | 260/94.9 |

OTHER PUBLICATIONS

Kirk-Othmer, Encylopedia of Chemical Technology, 2nd Ed., Vol. 14 pp. 259–278 TP E68. C.
*Crystallization of Polyethylene at Elevated Pressures*, D. V. Rees et al., Journal of Polymer Science Vol. 9, pp. 385–406 (1971).
*Extended–Chain Crystals*, Davidson et al., Journal of Polymer Science Vol. 7, 2054–2059 (1969)

*Primary Examiner*—Theodore Morris

[57] ABSTRACT

Linear ultrahigh molecular weight polyethylene exhibiting a unique combination of rigidity and toughness and the process for the preparation thereof comprising inducing crystallization of the molten polyethylene at temperatures in the range of about 150° to about 270°C. by rapidly increasing the pressure applied from an initial level of about 1 to about 1000 atmospheres or more depending on temperature to a second level of about 2000–7000 atmospheres and higher and then cooling rapidly while maintaining a pressure sufficient to maintain the linear polyethylene in the solid phase until the temperature is below the crystalline melting point of linear polyethylene at atmospheric pressure. The resulting rigid, tough linear ultrahigh molecular weight polyethylene having a crystalline melting point of 142° to 148°C. at atmospheric pressure, as measured by differential thermal analysis, and by the absence of detectable low-angle X-ray scattering peaks indicative of crystalline spacings in the range of 50 Å to 2000 Å and by the presence of a predominance of fold spacings of about 10,000 Å as determined by electron microscopy, and further characterized by exhibiting at room temperature an elastic modulus in the range of 165,000 to 500,000 psi., a density of 0.95 to 0.98 gram/cc at 25°C. and a tensile impact strength in the range of 125–600 ft.lb/in².

6 Claims, 13 Drawing Figures

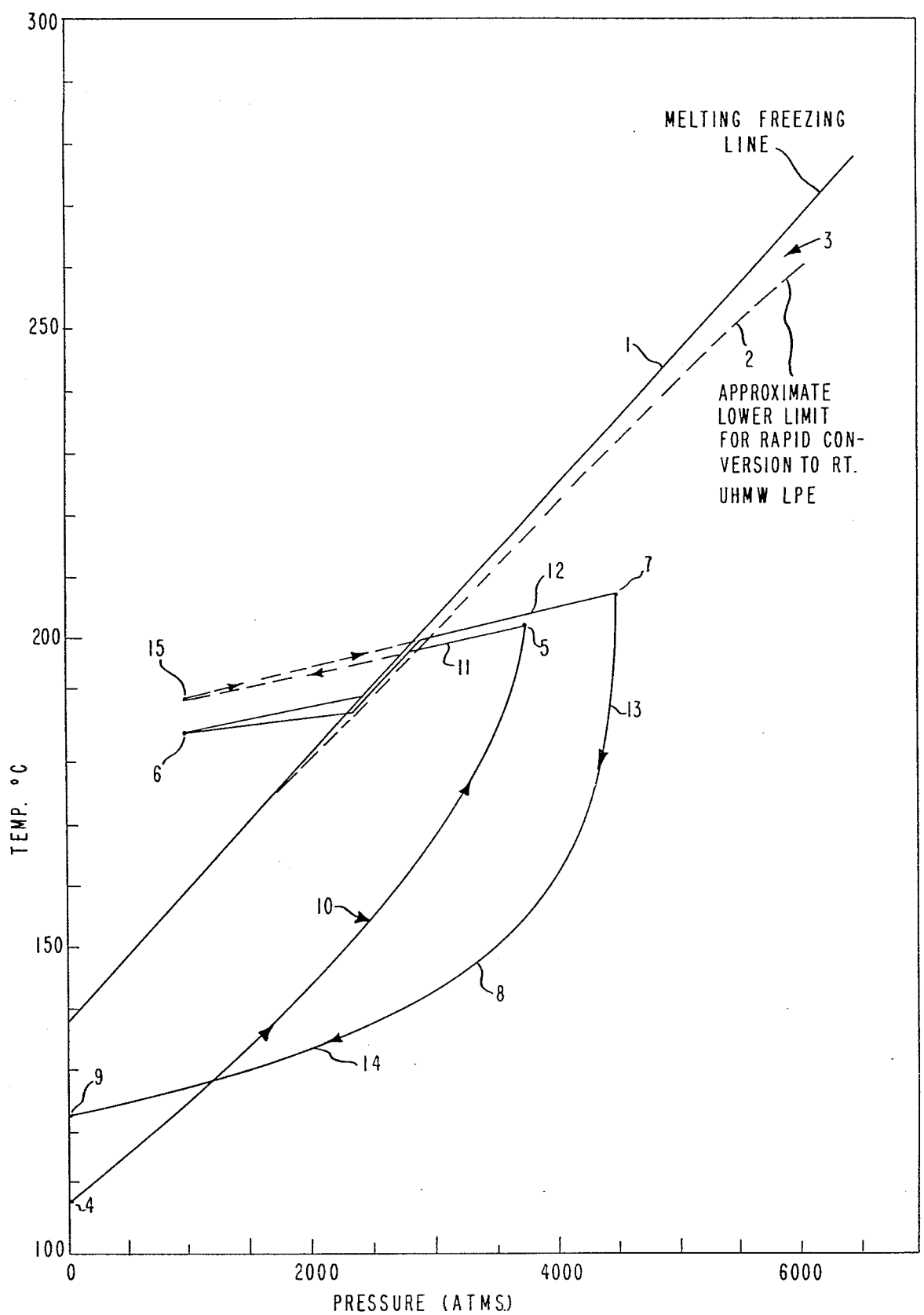

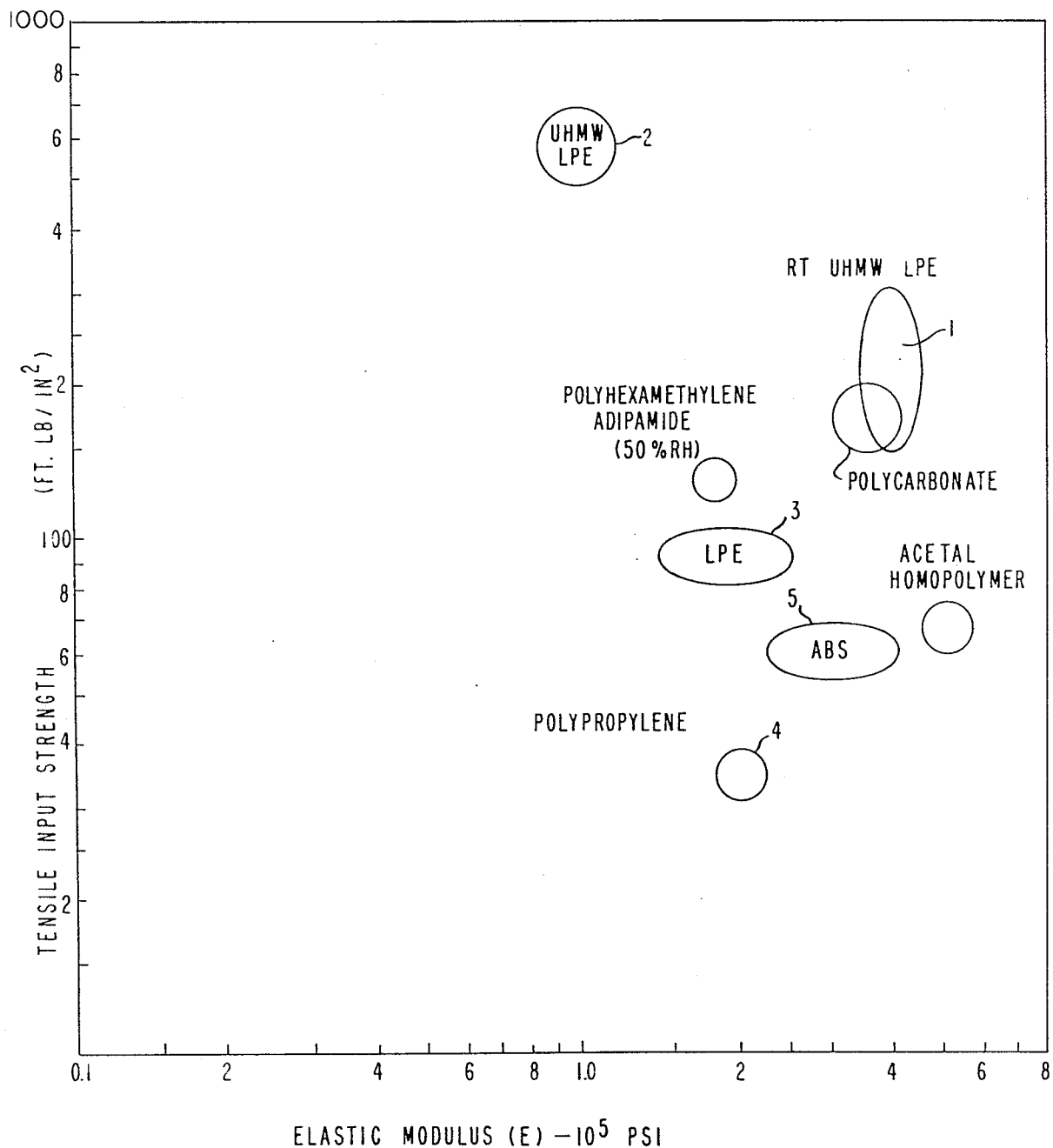

F I G. 8
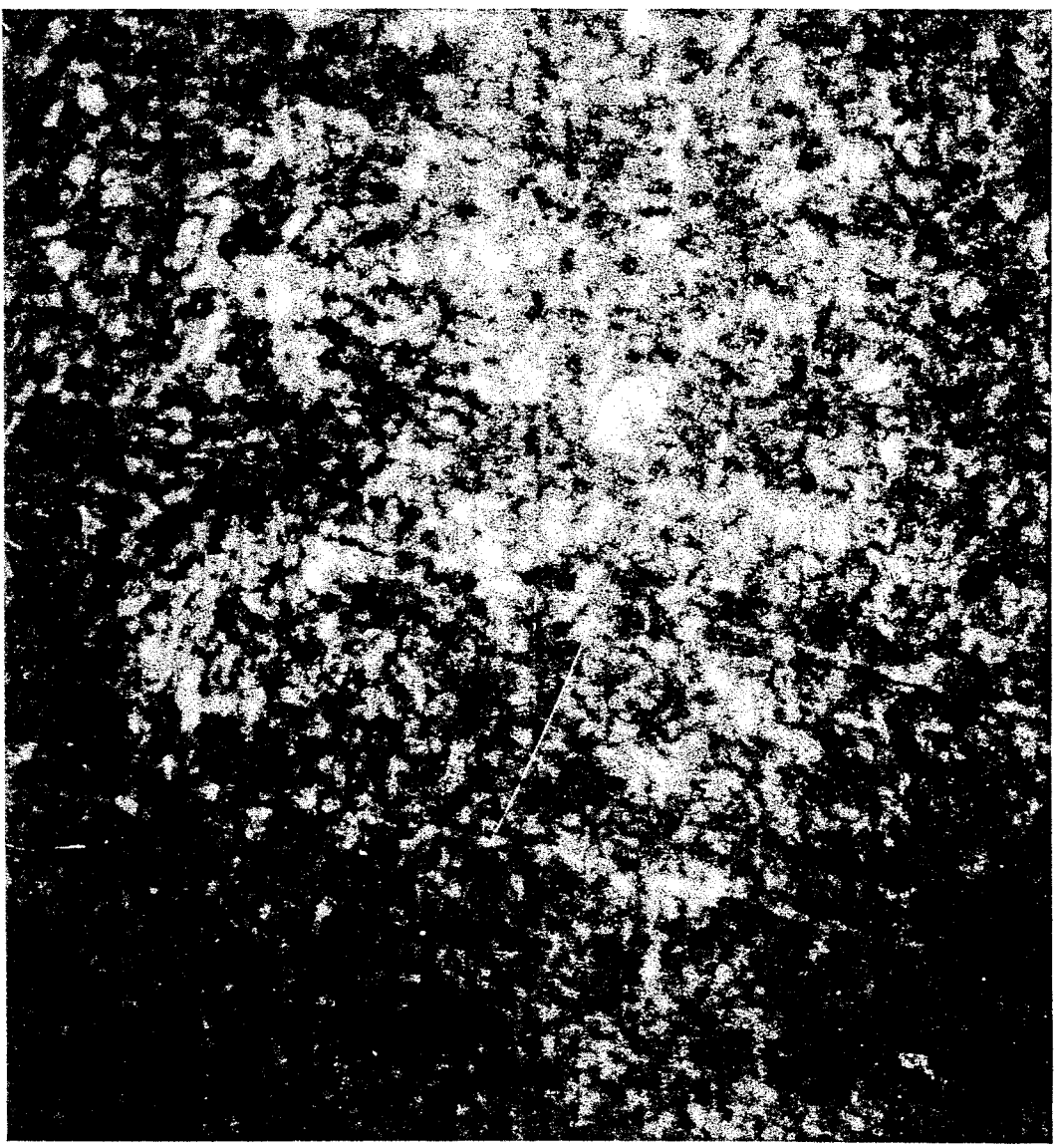

F I G. 9

EXCEPTIONALLY RIGID AND TOUGH ULTRAHIGH MOLECULAR WEIGHT LINEAR POLYETHYLENE

BACKGROUND OF THE INVENTION

1. Field of the Invention

This invention relates to ultrahigh molecular weight linear polyethylene exhibiting a unique combination of rigidity and toughness in fabricated forms and a process for conversion of normal ultrahigh molecular weight linear polyethylene into fabricated articles having a unique morphological form and exhibiting unexpected rigidity and toughness.

2. Description of the Prior Art

Ultrahigh molecular weight (UHMW) linear polyethylene (LPE) has been known for some time. Such products were frequently obtained following the polymerization process using coordination catalysts (e.g. reaction products of $TiCl_4$ and aluminum trialkyls) as first disclosed by Professor Karl Ziegler of the Max Planck Institute in Mulheim, West Germany. Such UHMW polyethylenes were not amenable to processing under commercial conditions in the conventional equipment used for plastics fabrication by means of injection molding, blow molding or screw extrusion. Subsequent process developments led to methods for molecular weight control yielding linear polyethylenes suitable for conventional processing above the crystalline melting point (128°–134°C.) and exhibiting normal viscous flow (melt indices of 0.10 to 50 and even higher). Such normal commercial grades usually have a $\overline{M}_w$ of the order of 150,000.

More recently, means have been disclosed for fabricating UHMW LPE into articles exhibiting outstanding toughness, as measured by impact strength, but relatively low stiffness, due apparently to the relatively low degree of crystallization of the polymers of ultrahigh molecular weight. The properties of sheets fabricated by compression molding from UHMW LPE have been described in some detail. Representative values listed in Table I were disclosed in SPE J, 27, 44 (June 1971).

TABLE I
PHYSICAL PROPERTIES OF UHMW LPE AS CONVENTIONALLY FABRICATED

| | |
|---|---|
| Density | about 0.94 g/cc |
| Tensile Yield Strength | 3000–3100 psi. |
| Ultimate Tensile Strength | 5500 psi. |
| Ultimate Tensile Elongation | 500–900% |
| Tensile Impact Strength | 500–1000 ft.lb/in$^2$ |
| Modulus (in flexure) | 85,000 psi. |
| Hardness, Rockwell R. | 50 |

From the physical properties tabulated in Table I it is apparent that, while UHMW LPE is tough and strong, its density (and hence also its crystallinity) and modulus are more characteristic of branched polyethylenes of intermediate density.

The morphology of linear polyethylenes of normal commercial grades having normal molecular weights ($\overline{M}_w$ of the order of 150,000) has been extensively studied over the years since first disclosed in the early 1950's. The linear chains exist in a linear zig-zag conformation and crystallize by folding back on themselves to a folded chain (FC) conformation having crystal fold-spacings normally in the range of 100 to 500 A but sometimes, depending on thermal history, over the range of 50–1000 A in the direction of molecular chains.

However, in recent years studies have been disclosed of the effects of very high pressures on the morphology of standard grades of linear polyethylene. Of particular significance in this regard are a series of papers published by Professor Bernhard Wunderlich and associates at Rensselaer Polytechnic Institute [*Journal of Polymer Science: Part A-2*, 7, 2043–2113 (1969)]. Wunderlich's publications describe the effects resulting from the application of very high pressures [2000–7000 bars (1 bar is approximately 0.9869 atm. or 14.504 lb/in$^2$)] during either annealing or crystallization from the melt. It is believed that under these conditions initial nucleation into folded chains is followed by chain extension in the solid state to give a new morphological form, termed extended-chain (EC) crystals. Furthermore, crystallization under such super pressures results in a degree of fractionation whereby the lower molecular weight fraction of the macromolecules crystallizes first as bundles of fully extended chains. Subsequently, most of the higher molecular weight fraction also crystallizes into bundles of extended chains or still greater lengths. Some of these higher molecular weight fractions appear to be folded to a reduced extent. However, a typical overall average value for these extended and partially extended chains is 2500 A.

The procedure described by Wunderlich involved placing normal polyethylene in bronze bellows, heating to a temperature above the atmospheric pressure melting point (about 133°C.) and placing the bellows into a heated hydrostatic fluid and applying pressures of 2–7 kilobars over a period of many hours, sometimes with slow cooling during this time. The resultant polyethylenes were characterized as brittle at room temperature, as having a density in the range of 0.980–0.993 g/cc and as having a crystalline melting point in the region of 141°–142°C. The process was repeated generally as described by Wunderlich and it was confirmed that, while the resultant EC polyethylenes had densities in the above range and were very stiff, they were brittle and friable on bending or striking at room temperature and inductile (1–2% elongation at break). Such limitations make them unattractive for use in the plastics industry.

SUMMARY OF THE INVENTION

There has now been discovered a novel process whereby ultrahigh molecular weight linear polyethylene (UHMW LPE) can be converted rapidly and economically into UHMW LPE which exhibits a unique, unexpected and extremely valuable combination of properties heretofore unobtainable with any polyolefin resin.

The critical feature of the process involves inducing the crystallization of UHMW LPE melt at temperatures above about 150°C. by rapidly increasing the pressure applied from an initial level of 1 to about 1000 atmospheres or more depending on temperature to a second level of about 2000 to about 7000 atmospheres and even higher, if desired, and then cooling rapidly while maintaining a pressure sufficient to maintain the LPE in the solid phase until the temperature is below the crystalline melting point of the LPE at atmospheric pressure. Crystallization into a unique rigid tough polyethylene occurs as the LPE passes rapidly through a crystallization zone at the liquid-solid phase boundary as the pressure is increased.

In accordance with the invention there now has been discovered rigid tough ultrahigh molecular weight linear polyethylene (RT UHMW LPE) characterized by an elastic modulus in the range of 165,000 to 500,000 psi., a tensile impact strength in the range of 125–600 ft lb/in$^2$, a crystalline melting point in the range of 142° to 148°C. at atmospheric pressure, as measured by differential thermal analysis, a density of 0.95 to 0.98 g/cc at 25°C. and a unique crystalline form characterized by the absence of any detectable low-angle x-ray scattering peaks indicative of fold spacings in the range of 50–2000 A and by the presence as seen in electron microscope photographs of cross sections, of a predominance of crystal spacings of about 10,000 A.

The UHMW LPE of this invention exhibits a unique, unexpected and extremely valuable combination of rigidity and toughness heretofore unobtainable with any polyolefin resin.

The RT UHMW LPE of this invention is prepared by a novel process comprising subjecting UHMW LPE to high pressures followed by rapid cooling while maintaining a sufficient pressure to keep the UHMW LPE in the solid phase until the temperature is below the crystalline melting point of the UHMW LPE at atmospheric pressure.

The critical feature of the process involves inducing rapid crystallization or rapid recrystallization of UHMW LPE at temperatures above about 150°C. and at pressures slightly, but not greatly, more than those required to crystallize the UHMW LPE at the operating temperature. These conditions may be reached in a variety of ways involving combinations of heating, cooling, compression and decompression of melted or solid UHMW LPE, as described in more detail below. After brief exposure under these conditions the UHMW LPE is compressed to a higher pressure and then cooled as rapidly as feasible to a temperture below the melting temperature of the resin at one atmosphere, so that the pressure may then be reduced to one atmosphere and the temperature to room temperature.

In accordance with the invention a process has been discovered for converting ultrahigh molecular weight linear polyethylene, having an $\overline{M}_w$ greater than 800,000 and for example, having a crystalline melting point in the range of 131° to 139°C. at atmospheric pressure as determined by differential thermal analysis, a reduced specific viscosity greater than 8, measured at 135°C. in decahydronaphthalene at a concentration of 0.05–0.10% by weight of polyethylene after applying a correction to reduce the results to zero shear and a crystalline morphology characterized by the presence of low-angle X-ray scattering peaks indicative of fold spacings in the range of 50 A to 2000 A, into a different crystalline form characterized by a crystalline melting point of 142° to 148°C. at atmospheric pressure, as measured by differential thermal analysis, and by the absence of detectable low-angle X-ray scattering peaks indicative of crystalline spacings in the range of 50 A to 2000 A and by the presence of a predominance of fold spacings of about 10,000 A, as determined by electron microscopy, and further characterized by exhibiting at room temperature an elastic modulus in the range of 165,000 to 500,000 psi. a density of 0.95 to 0.98 grams/cc at 25°C. and a tensile impact strength in the range of 125–600 ft.lb/in$^2$, which comprises inducing crystallization of the molten polyethylene at temperatures in the range of 150° to 270° C. by rapidly increasing the pressure applied from an initial level of 1 to about 1000 atmospheres or more depending on temperature to a second level of about 2000 to about 7000 atmospheres and higher and then cooling rapidly while maintaining a pressure sufficient to maintain the linear polyethylene in the solid phase until the temperature is below the crystalline melting point of linear polyethylene at atmospheric pressure.

The process of this invention also involves preparing rigid tough (RT) linear polyethylene (LPE) from ultrahigh molecular weight linear polyethylene having an $\overline{M}_w$ greater than 2,000,000, said RT LPE being characterized by exhibiting in combination an elastic modulus in the range of 270,000 to 460,000 psi., a tensile impact strength in the range of 140–480 ft.lb/in$^2$, a crystalline melting point in the range of 143° to 146°C. at atmospheric pressure as measured by differential thermal analysis, and a density at 25°C. in the range of 0.96 to 0.98 g/cc., by a process which comprises heating the linear polyethylene to a temperature in the range of about 150° to about 230°C. under substantially atmospheric pressure, rapidly applying a presssure to the heated mass of between 3000 and 6000 atmospheres and higher over a period of from 0.5 to 300 seconds to force the polyethylene, by plastic flow, into a mold, and holding the thus shaped mass under the aforesaid pressure to allow crystallization to occur under pressure while cooling rapidly to a temperature in the range of 20° to 120°C., releasing the pressure and removing the shaped article from the mold.

Alternative procedures may be used to initiate the process. Thus, in the process involving crystallization the UHMW LPE can first be melted near atmospheric pressure and heated to the range of about 150° to about 210°C. prior to applying pressure rapidly to about 3000 to about 5000 atmospheres. Alternatively, the UHMW LPE can be simultaneously heated and compressed, passing from the solid to the liquid phase, and then again to the solid phase.

The process also involves forming an RT LPE from ultrahigh molecular weight linear polyethylene having an $\overline{M}_w$ greater than 800,000, said RT LPE being characterized by exhibiting in combination an elastic modulus in the range of 165,000 to 500,000 psi., a tensile impact strength in the range of 125 to 600 ft.lb/in$^2$, a crystalline melting point in the range of 142° to 148°C. at atmospheric pressure, as measured by differential thermal analysis and a density at 25°C. in the range of 0.95 to 0.98 g/cc. by compressing the linear polyethylene maintained in the solid state to a pressure in the range of 2000–7000 atmospheres while heating to a temperature in the range of 170°–260°C., and then rapidly recrystallizing the linear polyethylene by decompressing to the range of 1–3500 atmospheres and immediately recompressing the linear polyethylene at a pressure in the range of 2000–7000 atmospheres, then rapidly cooling to a temperature below about 120°C. while maintaining a pressure in the range of 500–7000 atmospheres sufficient to maintain all of the linear polyethylene in the solid phase, and thereafter releasing the pressure and recovering the RT LPE.

In still another alternative procedure wherein recrystallization is involved the UHMW LPE is compressed to about 3000 to 6000 atmospheres and heated to at least about 185°C. or into the range of 185°–230°C., entirely in the solid phase and then subjected to a rapid decompression to about 10–1500 atmospheres and then recompressed to about 3000–6000 atmospheres.

This procedure results in recrystallization from the normal folded chain morphology to the novel highly extended folded chain morphology with relatively small temperature change which minimizes the need for time for heat transfer to occur in the crystallization process. Thereafter, the linear polyethylene is cooled rapidly to below about 120°C. while maintained under sufficient pressure to keep it all in the solid phase. Once the temperature is below the temperature of melting at atmospheric pressure, the pressure can be rapidly released.

In another preferred embodiment the process comprises heating ultrahigh molecular weight linear polyethylene at or near atmospheric pressure to a temperature in the range of about 150° to about 180°C. rapidly applying to the heated mass over a period of from 1.0 to 300 seconds a pressure in the range of 3000 to 5000 atmospheres and then cooling to a temperature in the range of 20° to 120°C. as rapidly as heat transfer can be accomplished, releasing the pressure and obtaining RT UHMW LPE in a unique morphological form. The process is operable at pressures above 5000 atmospheres but such higher pressures are not required.

The polyethylene of the present invention is referred to herein as "RT polyethylene" or "RT UHMW polyethylene" in view of its unique combination of high rigidity and toughness, comparable in the plastics field to that of the polycarbonates. Unlike ordinary linear polyethylene or UHMW LPE prepared by other methods, this RT polyethylene is malleable, like metals; it exhibits unusual hardness and a very low coefficient of friction. It can be machined into precision shapes such as gears, nuts and bolts, fasteners and the like. It can be further fabricated by solid state extrusion under very high pressures into shaped articles such as cups.

For the purposes of this invention ultrahigh molecular weight linear polyethylene (UHMW LPE) is defined as a linear polyethylene having an estimated weight-average molecular weight ($\overline{M}_w$) in excess of about 800,000, usually 2,000,000 to 3,000,000, as defined by a melt index (ASTM D-1238) of essentially zero and a reduced specific viscosity (RSV) greater than about 8, preferably 25 to 30. The RSV is obtained by measuring the specific viscosity at 135°C. in decahydronaphthalene at a concentration of 0.05 to 0.1% by weight of a solution of the polyethylene after applying a correction to reduce the results to zero shear rate and after dividing this corrected result by the concentration (c) expressed as grams/100 cc of solution at 135°C. The relationships of RSV to intrinsic viscosity and to $\overline{M}_w$ are those developed by R. Chaing as presented by P. S. Francis, R. C. Cooke, Jr., and J. H. Elliott, *J. Polymer Science*, 31, 453 (1958). For the purposes of this invention satisfactory determinations of RSV may also be obtained from measurements of viscosity in other solvents through the correlations presented by M. O. De La Cuesta and F. W. Billmeyer, *Journal Polymer Science, Part A*, 1, 1721–1734 (1963). The UHMW LPE of this invention includes but is not limited to the very high molecular weight linear polyethylene described in *Properties and Uses of Very High Molecular Weight High-Density Polyethylene* by W. D. Gloor, Modern Plastics, November, 1961. With some samples of extremely high $\overline{M}_w$, portions representing the highest molecular weight failed to dissolve, so that the determination of $\overline{M}_w$ through solution viscosity in these samples is in error. However, in these cases (1) actual values of c are less than computed values, (2) viscosities are, thus, less than those which would have been obtained had all material dissolved, so that (3) the resulting values of $\overline{M}_w$ were less than those for complete solution. Thus, these values of $\overline{M}_w$ can be construed as minimum values.

The modulus of elasticity is the ratio of a tensile or a compressive stress to the corresponding strain at strains low enough, usually less than 1 to 2%, that the relation between stress and strain is linear, for practical purposes at least. Although the modulus values below were obtained through experiments in tension, equally satisfactory values could have been obtained through compression or flexure. Whatever the test mode the results may be used to interpret and predict behavior broadly through formulas that are well known.

BRIEF DESCRIPTION OF THE DRAWINGS

FIG. 2 is a schematic diagram imposed on a phase diagram which illustrates the temperature, pressure and resulting phase changes which occur in a preferred high temperature recrystallization process.

FIG. 3 is a plot, on a log-log scale, of representative values of tensile impact strength (TI), in foot pounds per square inch, versus representative values of elastic modulus (E) in pounds per square inch for RT polyethylene, as prepared by the process of the present invention (defined by the oval region 1) as compared with other forms of linear polyethylene and other known thermoplastic resins. This serves to illustrate the unique combination of rigidity and toughness exhibited by RT polyethylene. The region defined by the circle, 2, defines these properties for normal folded chain UHMW LPE. The region defined by the oval, 3, defines these properties for high density linear polyethylene of normal commercial grade. The region defined by the circle, 4, defines these properties for isotactic, highly crystalline polypropylene. The region defined by the oval, 5, defines these properties for commercial ABS resins. The region defined by the circle 6 defines these properties for polyhexamethylene adipamide of 50% R.H. The region defined by the circle 7 defines these properties for acetal homopolymers. In FIG. 3 the polycarbonate region is shown the relative positions of tensile impact strength and elastic modulus of various known polymers.

FIG. 6 (b) is an optical microscopic view of structures in microtomed sections observed between crossed polaroids showing grainy birefringence in sample B of Example 6 at a magnification wherein the bar shown equals 10 microns.

FIG. 6 (c) is an optical microscopic view of structures in microtomed sections observed between crossed polaroids showing ringed spherulites in sample C of Example 6 at a magnification wherein the bar shown equals 10 microns.

FIG. 8 is a Transmission Electron Microscope (TEM) picture of a microtomed section of sample B of Example 6 showing a random fibrous structure at a magnification wherein the distance between markers is 10 microns.

FIG. 9 is a Transmission Electron Microscope (TEM) picture of a microtomed section of sample C of Example 6 showing a ringed spherulite structure at a magnification wherein the distance between markers is 10 microns.

Figure 1:
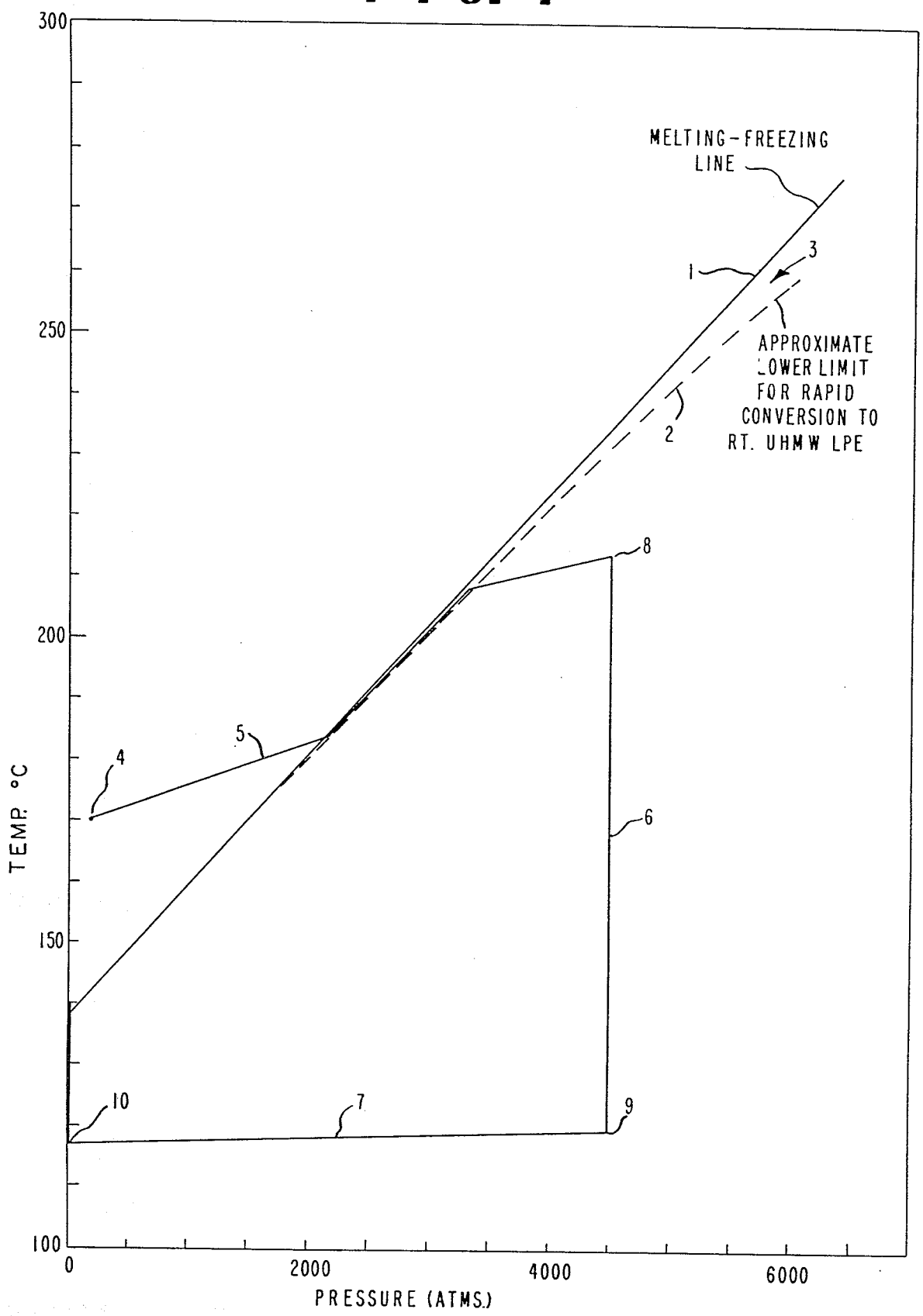
FIG. 1 is a schematic diagram imposed on a phase diagram for the purposes of illustrating the temperature, pressure and resulting phase changes of one embodiment of the process of this invention.

The physical properties of the novel RT polyethylene of this invention are exemplified in Table II.

TABLE II

| PHYSICAL PROPERTIES OF RT LINEAR POLYETHYLENE | |
| --- | --- |
| Density | 0.950–0.980 g/cc |
| Tensile Yield Strength | 3400–4900 psi. |
| Ultimate Tensile Strength | 4600–5700 psi. |
| Elongation at Yield | 3–13% |
| Ultimate Tensile Elongation | 70–310% |
| Tensile Impact Strength | 125–524 ft.lb/in$^2$ |
| Elastic Modulus | 165,000–450,000 psi. |
| Hardness, Rockwell R | 91 |

The combination of properties exhibited by this RT polyethylene is completely outside anything previously described for a linear polyethylene, isotactic polypropylene or any other previously described polyolefin. FIG. 3 illustrates this uniqueness with respect to the combination of toughness as measured by tensile impact strength, and stiffness.

In a preferred embodiment RT polyethylene exhibits, in combination, a tensile impact strength in the range of 140–300 ft. lbs/in.$^2$ and an elastic modulus in the range of 340,000–460,000 psi.

The morphology of RT polyethylene also is unique. Low-angle X-ray diffraction shows a complete absence of any low-angle scattering peaks indicating fold spacings in the 50 to 2000 A region characteristic of normal linear polyethylene morphology and of the EC morphology of LPE in the normal molecular weight range. Rather the polymer exhibits a predominance of fold spacings of the order of 10,000 A (1 micron), as measured by electron microscopic photographs of cross sections. Since a true EC morphology for UHMW LPE with a weight average molecular weight ($\overline{M}_w$) equal to 2,000,000 would require an average length in crystalline array of about 182,000 A (18.2 microns), it is believed that this unique morphology involves either the presence of folded chains with distances between folds of approximately 10,000 A or a fringed micelle with the probability that the crystallites are frequently connected by molecular chains extending from one to another. Such anomalies can be termed structural "defects" in that they represent departures from perfectly ordered arrays. They are the counterparts in polymer morphology of defects such as vacancies and dislocations which have proved to be vitally important aspects of the structure of metals and other crystalline, non-polymeric materials.

While the precise role of these "defects" in determining the observed physical characteristics of RT polyethylene has not been established, the probability exists that the special processing herein described combined with UHMW LPE to produce the novel "defect structures" which are partially or wholly responsible for the outstanding physical characteristics of the RT product.

The observed combination of physical properties associated with highly extended folded chain (HEFC) polyethylene is completely unexpected and not predictable from the previously observed properties of either normal FC polyethylenes or of the EC polyethylenes described by Wunderlich and others.

Figure 4A:
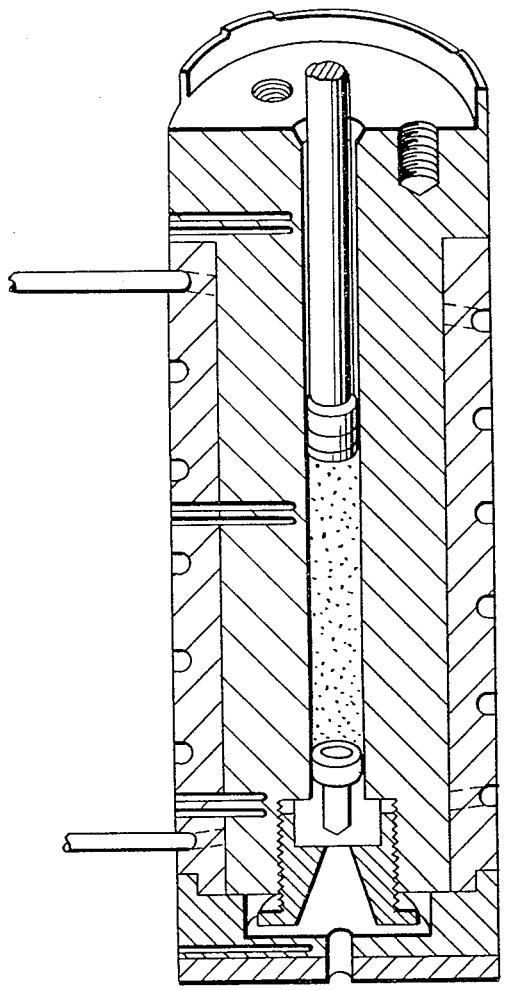
FIG. 4 is a drawing of two apparatus suitable for fabricating stock cylinders of RT polyethylene in a cylindrical mold using a piston to apply pressure.

In preferred embodiments of the process of this invention RT polyethylene is produced as a stock cylindrical shape suitable for machining into useful articles. UHMW LPE is charged to a cylindrical mold (FIG. 4(a) or 4(b)), heated to about 150°–210°C. and melted at substantially atmospheric pressure. It is known that the crystalline melting point, as measured by dilatometric analyses, rises with increasing pressure (see FIG. I, line 1). Therefore, crystallization is induced by forcing the piston into the mold rapidly. The pressure required to obtain the fabricated article in the form of RT polyethylene is determined by the initial temperature and is higher, the higher the starting temperature. When the lowest starting temperature is 150°–180°C. the lowest effective terminal pressure is about 3000 atmospheres. At a starting temperature of 210°C., the lowest effective terminal pressure is about 5000 atmospheres.

Depending upon the size of the sample and mold, and provided that the system is substantially free from leakage, compression requires from about 5 to about 300 seconds. Then the sample must be kept under substantially isobaric pressure while cooled rapidly to a temperature below the melting point of normal FC UHMW LPE at atmospheric pressure (about 128°–134°C.) so that upon release of pressure, the UHMW LPE will not melt. In a ⅝ inch diameter mold, cooling with water required about 5 minutes. In a 2 inch diameter mold, cooling with air required about 120 minutes.

The process of this invention as described herein is also believed to be exemplified by reference to FIG. 1. Referring now to FIG. 1, line 1 defines the phase separation between liquid (molten)polyethylene, above line 1, and solid crystalline polyethylene, below line 2. Lines 1 and 2 define a crystallization zone, 3. The process exemplified commences at point 4 with the UHMW LPE heated to 170°C. at or near atmospheric pressure. When pressure is rapidly applied, the temperature increases along line 5, passing through a crystallization zone 3 where nucleation and initial crystallization occur. At point 8, the pressure increase is stopped. Isobaric cooling along line 6 to point 9 completes the crystallization. Rapid expansion with release of pressure then follows line 7, and the fabricated article can then be removed from the mold at atmospheric pressure, point 10, at a temperature below the crystalline melting point.

The temperature rise shown in FIG. 1 is due to the exothermal nature of the compression process. The actual temperature reached at point 8 is estimated, since accurate measurement of internal temperature in the compressed LPE at the moment of maximum pressure is very difficult to achieve.

Where heat transfer may be a limiting factor in the rate of production, a process exemplified in FIG. 2 can be used, in whcih the UHMW LPE having normal FC morphology is heated and compressed entirely in the solid state (below line 2) to an initial temperature of about 200°C., or in the range from 170° to 260°C., and to an initial pressure of 2,000 to 7,000 atmospheres. Rapid recrystallization is then induced by rapidly decompressing to and into crystallization zone 3 and then recompressing to 2,000 to 7,000 atmospheres. Thereafter the LPE is rapidly cooled to below its melting point at atmospheric pressure, and preferably below about 120°C., while maintaining pressures in the range of 500 to 7,000 atmospheres sufficient to maintain all of the LPE below line 2 of FIG. 2 and, thus, in the solid state.

Referring now to FIG. II, lines 1 and 2 again define crystallization zone 3. The process starts at point 4 where the UHMW LPE is at atmospheric pressure and at a temperature above room temperature but below the one atmosphere melting temperature. The temperature and pressure are increased along line 10 to a point 5 in the solid phase at about 200°C., or from 170° to 260°C., and below the crystallization zone. Then rapid decompression along line 11 causes the UHMW LPE to pass with some decrease in temperature into or into and beyond or above the crystallization zone. Because the experiment is conducted rapidly and the period at reduced pressure is brief, so that equilibrium may well not be reached, and because experimental difficulties prevent measurements of point-to-point pressures and point-to-point temperatures within the UHMW LPE, it is not possible to specify the process exactly for cases in which the UHMW LPE passes above the crystallization zone. The path in FIG. 2 through the crystallization zone 3 and to point 6 shows approximately what may be expected for the expansion at equilibrium to 1,000 atmospheres, if this can be achieved. For nonequilibrium cases it can be expected that the path will be a projection of line 11, more or less, as indicated by the broken line to point 15. At point 6, or point 15, about 1,000 atms., or 1 to about 3,000 atms., decompression is stopped. The UHME LPE then is recompressed along line 12, passing from or to and then from crystallization zone 3 to a point 7 at 4,000 to 7,000 atms. Cooling with some decompression occurs along line 13 to point 8. Rapid decompression along line 14 to atmospheric pressure at a point 9 below 125°C. then permits recovery of the fabricated article consisting of RT polyethylene. Again, as shown by the slope of line 11, decompression is endothermic particularly in the recrystallization zone where the endothermic recrystallization process occurs. Recompression along line 12 is exothermic, particularly during recrystallization (zone 3).

The following Examples illustrate the invention but are not intended to limit it since obvious modifications will be apparent.

EXAMPLE 1

Thin sheets of RT polyethylene can be very rapidly prepared from compression-molded normal FC UHMW LPE in a rapid, stamping process. As an example, ¼ × ¼ inch pieces of ⅛ inch compression-molded FC UHMW LPE were placed on a film of Teflon polytetrafluoroethylene resin on a hot plate at atmospheric pressure in order to melt the UHMW LPE. The temperature of the sensing device was 160°C. on top and 270°C. on the hot plate side. The temperature thus of the sample was about 160°C. on the air side and 270°C. on the hot plate side.

The molten UHMW LPE was then transferred rapidly to the cold (room temperature) lower platen of an 8 ton hydraulic press and compressed at the full capacity of the press over the range of about 0.5 second to 3 seconds in separate experiments. Pressure was then immediately released and a small sheet of RT polyethylene recovered having about 3X increase in transverse dimensions. The sheet exhibits the combination of exceptional stiffness and toughness characteristic of RT polyethylene.

EXAMPLE 2

Figure 4B:
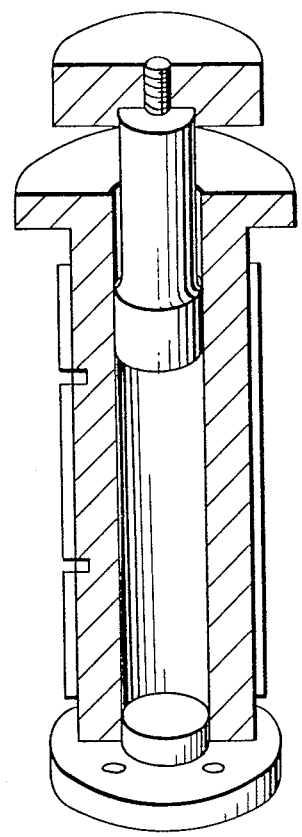
Figure 5A:
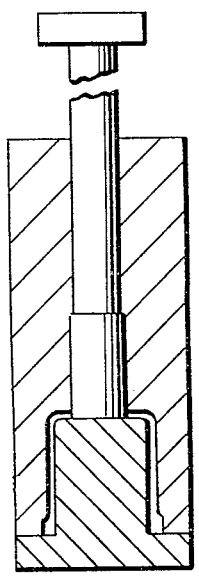
FIG. 5 is a drawing of apparatus suitable for cold-forming of RT polyethylene from cylindrical plugs by plastic flow under very high pressure. The mold shown produces a cup-shaped article. Other molds can be substituted.
Figure 5B:
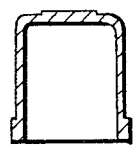

The apparatus shown in FIG. 4(b) was used. A 2 inch diamter rod mold was heated at 170°C. and was charged with approximately 1.3 pounds of UHMW LPE (nominal $\overline{M}_w$ about 2,000,000). In order to fully fill the mold and eliminate entrapped air, repeated compaction over ½ hour was required using the 700 ton hydraulic press. A further period of about 1½ hours at low pressure and 170°C. mold temperature was allowed for completion of heat transfer and melting of the sample. With the sample at temperature equilibrium, the two-inch diameter piston was loaded as rapidly as feasible (5 to 10 seconds) to the level of 75 tons of force (48,000 psi., 3260 atms.) to crystallize the sample. The mold was then cooled rapidly while maintaining this pressure, to about room temperature, requiring about 150 minutes. Pressure was then released. In order to free the product readily, the mold was immersed in dry ice and a 10 inch long cylindrical sample recovered. This process is representative of the process illustrated in FIG. 1.

The cylindrical sample proved to be extensively, though not fully converted to RT UHMW LPE. This could be judged qualitatively by the white color and the great hardness of the converted regions relative to the unconverted FC UHMW LPE, and quantitatively by DTA' measurements. The unconverted regions were found largely toward the wall and toward the bottom of the mold, probably because the material in these regions was cooler than the material at the mold axis and top. Specimens from the converted regions were prepared for testing through machining. Results of this testing are shown in Table III. Insofar as feasible the specimens were made and tested according to the ASTM methods specified in the Table. However, because the dimensions of the RT LPE product and the quantity of this product were relatively limited, particularly with respect to the diametral direction of the cylindrical product rod, the ASTM procedures could not be followed fully. Thus, with respect to ASTM D-1708, (a) specimens were ½ inch wide at the tabs, rather than the specified ⅝ inch, (b) only two to five specimens per test, rather than five minimum, could be run, (c) standard deviations were not computed, and (d) tests in more than one direction were made only to the extent specified in Table III. During the early portions of the ASTM D-1708 determinations, modulus of elasticity was determined through the combined output on the testing-machine recorder of the standard force cell and of a standard extensometer; during this early portion of the experiment the crosshead was operated at a rate of 0.05 inch/min., rather than the standard 0.5 inch/min. With respect to ASTM D-1822, (a) specimens were 1/16, rather than ⅛ inch thick, (b) only two to five specimens per test, rather than five minimum, could be run, (c) the specimens were clamped securely, but not bolted, (d) tests in more than one direction were made only to the extent specified in Table III, and (e) standard deviations were not computed.

The process was repeated at 160°C. mold temperature with similar results except that the toughness, as measured by tensile impact strength, was increased. Again, the results are shown in Table III.

EXAMPLE 3

The malleability of the RT polyethylene product in Example 2 was illustrated by biaxial rolling of transverse circular sections from the 2 inch rod prepared through the 160°C. crystallization in Example 2. Because these sections were small in diamter and thus could not be uniformly restrained during rolling, the products proved to be somewhat irregular in transverse dimensions and in thickness. From the mean thicknesses shortly after rolling the deformation ratios were approximately (a) 1.9X × 1.9X, (b) 2.3X × 2.3X, and (c) 2.7X × 2.7X Later, after some recovery had occurred and when the specimens were tested using the procedures outlined in Example 2, the mean deformation ratios of the test specimens were approximately (a) 1.8X × 1.8X, (b) 2.1X × 2.1X, and (c) 2.4X × 2.4X. The properties observed in these tests are summarized in Table III.

By comparison, the original UHMW LPE used in Examples 2, 3 and 4 in normal compression molded from exhibited normal FC morphology by X-ray diffraction, a crystalline melting point by DTA of 134°–136°C. and an elastic modulus of only 83,000 psi.

EXAMPLE 4

The rod mold was filled with melted UHMW LPE at 170°C. in the manner described in Example 2. With the sample at temperature equilibrium the piston was loaded to the level of 7 tons (4,450 psi., 303 atm.) The mold was then cooled while maintaining this load to about room temperature, producing a rod of UHMW LPE having the normal FC morphology. This was recovered through cooling with dry ice as described in Example 2.

This sample, about 12 inches long, was shortened in a lathe to about 9 inches and reinstalled in the mold with 1½ inch long by 2 inch diameter (sliding fit in the mold) plugs of tetrafluoroethylene resin at each end of the polyethylene rod. The tetrafluoroethylene plugs served to reduce leakage at the ends of the mold to acceptable levels during the relatively long periods at high temperature and pressure required in the subsequent experiment.

Piston load was then increased to 75 tons (48,000 psi. 3,260 atm.) and the mold and its contents were heated to 205°C., the pressure generated by the piston load serving to prevent the charge from melting. The temperature control system was then adjusted to control at 200°C. In about three minutes the temperature of the steel mold reached equilibrium at 200°C., leaving the temperature of the central portions of the polyethylene charge at or only slightly below the previous equilibrium temperature of 205°C. The ram load was then reduced sufficiently that the compressed contents of the mold forced the piston to emerge from the mold by about 2.3 inches. Ram load was then restored to 75 tons. The ram load at its minimum value during the expansion was about 2 tons, corresponding to a nominal pressure of about 1,200 psi. or 80 atm. However, because the piston was not allowed sufficient time at minimum load to minimize frictional effects, true pressure within the mold at minimum load must have been substantially greater.

TABLE III

PROPERTIES OF RT POLYETHYLENE OF EXAMPLES 2, 3 AND 4

| EXAMPLE | MELT TEMP. AT START °C. | MORPHOLOGY[1] | TEST DIRECTION[2] | MELTING PT. DTA PEAK[3] °C. | VICAT. TEMP.[4] °C. | TENSILE STRENGTH[5] PSI. YIELD | ULTIMATE |
|---|---|---|---|---|---|---|---|
| 2 | 170 | RT | A | 145 | — | 4620 | 5660 |
| 2 | 170 | RT | D | 145 | — | 4900 | — |
| 2 | 160 | RT | A | 145 | — | 4360 | 5100+ |
| 2 | 160 | RT | D | 145 | 138 | 4790 | 5270+ |
| 3(a) | 160 | RT | D | 145 | — | 5640 | 9040 |
| 3(b) | 160 | RT | D | 144 | — | 6190 | 9880 |
| 3(c) | 160 | RT | D | 144 | — | 6810 | 12,000 |
| 4 | 205 (solid) | RT | A | 144 | — | 4200 | 4,900 |

| EXAMPLE | ELONGATION[6] % YIELD | ULTIMATE | TENSILE IMPACT STRENGTH[7] FT.LB/IN.[2] | IZOD IMPACT STRENGTH[8] FT.LB/IN. | ELASTIC MODULUS[9] PSI. |
|---|---|---|---|---|---|
| 2 | 2–5 | 70–160 | 125 | > 14 | 394,000 |
| 2 | 3 | — | 157 | — | 440,000 |
| 2 | 4–9 | 204+ | 337 | > 19 | 346,000 |
| 2 | 4 | 310 | 524 | — | 430,000 |
| 3(a) | 11 | 147 | 290 | — | 279,000 |
| 3(b) | 9 | 117 | 260 | — | 160,000 |
| 3(c) | 13 | 120 | 284 | — | 362,000 |

TABLE III-continued

| EXAMPLE | ELONGATION[6] % YIELD | ULTI- | TENSILE IMPACT STRENGTH[7] FT.LB/IN.[2] | IZOD IMPACT STRENGTH[8] FT.LB/IN. | ELASTIC MODULUS[9] PSI. |
|---|---|---|---|---|---|
| 4 | — | 200 | 460 | 22 | 308,000 |

NOTES:

[1]"RT" designates the HEFC morphology unique to RT polyethylene. X-ray shows no spacings in the range of 50–2000 A. Electron-micrographs of cross sections show the presence of crystals having about 10,000 A spacing.

[2]A = axial; D = diametrical

[3]The Du Pont DTA analyzer, Model 900 was used at a heating rate of 10°C. per minute. The values shown are minimum values.

[4]Determined in accord with ASTM D-1525, as outlined above.

[5]The procedure of ASTM D-1708 was used, as outlined above.

[6]The procedure of ASTM D-1708 was used, as outlined above.

[7]The procedure of ASTM D-1822 was used, as outlined above.

[8]The notched specimen and procedure of ASTM D-256 were used. However, the samples did not break so the result is nonstandard.

[9]The procedure of ASTM D-1708 was used to obtain modulus in tension, as outlined above.

The period with load less than 75 tons totaled about 5 minutes, representing largely the time required to reduce and then to restore pressure in the hydraulic system operating the press. The decrease in control temperature from 205° to 200°C prior to the expansion was included to reduce the temperature gradients generated within the polyethylene by adiabatic cooling during the period of expansion and in this fashion to promote conversion to RT HDPE. After restoring piston load to 75 tons the mold was cooled rapidly while maintaining this load to about room temperature. The load was then removed and the sample recovered in the fashion described in Example 2. This process is representative of the process illustrated in FIG. 2.

As with the crystallized samples in Example 2, the recrystallized sample proved to be only partly converted to RT UHMW LPE. However, reflecting the different thermal conditions generated through expansion, as opposed to compression, the unconverted regions were found near the axis of the cylindrical mold, probably because the material in these regions was cooler than the material adjacent to and in thermal contact with the walls of the mold. Specimens from the converted regions were prepared and tested as described in Example 2 with the results in Table III.

EXAMPLE 5

Plugs of RT polyethylene, prepared as previously described in Example 2 can be formed into articles (e.g., cup-shaped, tubular, and miscellaneous other shapes) by extrusion in the solid state under very high pressure. In this way, small cup-shaped articles were formed from cylindrical plugs 0.50 inch in diameter by 0.86 inch in length (machined from a stock cylinder prepared as in Example 2) of RT polyethylene. The apparatus and mold used are shown in FIG. V. The mold and extrusion cylinder were heated to about 70°C. Pressure was then applied to the cylindrical plug by means of a ½ inch diameter piston loaded to impose about 18 tons/in[2] load on the plug. The RT polyethylene then was extruded by forward solid-state plastic flow into the mold in about 4 minutes to yield cups having a 1 inch diameter and a 1 inch depth. These cups still exhibited the 145°C. melting point by DTA and the malleability characteristics of RT polyethylene. At higher pressures, the time can be reduced.

The exceptional toughness and malleability of the RT polyethylene was demonstrated by pounding the cups heavily with a 1 pound wooden mallet which permanently deformed them but without shattering or breaking them.

EXAMPLE 6 - MICROSCOPIC OBSERVATIONS

Examination of a sample of ultrahigh molecular weight polyethylene crystallized in accordance with the invention has shown a morphology quite distinct and different from other polyethylene samples examined. A sample of UHMW polyethylene was prepared according to the process of Example 2 and labeled sample A. A sample of low pressure crystallized normal UHMW LPE was labeled sample B. A sample of low pressure crystallized normal MW LPE was labeled sample C.

Figure 6A:
FIG. 6 (a) is an optical microscopic view of structures in microtomed sections observed between crossed polaroids showing "needles" in sample A of Example 5 at a magnification wherein the bar shown equals 10 microns.
Figure 6B:
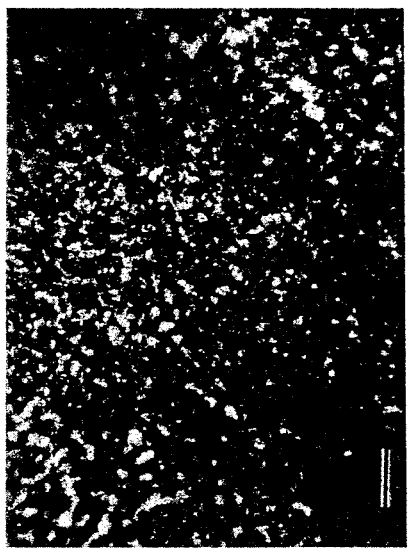
Figure 6C:

Microtomed sections were examined with the optical microscope in transmitted light between crossed polaroids and shown in FIGS. VI(a), (b) and (c). Micrograph VI(a) shows the structure of sample A, which consists of roughly aligned needles, ca. 10 microns long by 1 micron wide. This is quite different from the structure of sample B shown in micrograph FIG. VI(b) where a grainy birefringence is observed, and also quite different from the structure of sample C shown in micrograph FIG. 6(c), where the more familiar (ringed) spherulitic structure is seen.

Figure 7:
FIG. 7 is a Transmission Electron Microscope (TEM) picture of a microtomed section of sample A of Example 6 showing parallel needles at a magnification wherein the distance between markers is 10 microns.

This difference is further illustrated by FIGS. 7 to 9 where structures observed in microtomed sections with a transmission electron microscope show the parallel needles in sample A, a rather random, fibrous structure in sample B, and the ringed spherulitic structure of sample C.

The morphology of a cryogenic fracture surface of sample A was observed in the Scanning Electron Microscope. The surface was composed of striated lamellae, interconnected by many fibrils. The long dimensions of the lamellae are roughly parallel and the width corresponds to that of the needles observed in the thin sections. A similar fracture surface after treatment in fuming nitric acid to remove the fibrils was observed in the Scanning Electron Microscope. The lamellae were quite evident.

The Transmission Electron Microscope was used to observe the morphology of a two-stage replica of the fracture surface of sample A. The striated lamellae and fibrils were again typical. However, these features were not seen on the fracture surfaces of samples B and C.

DTA specimens were taken from positions immediately adjacent to the places where the thin sections were microtomed. The melting curves were run at 10°C./min. heating rate and had single, fairly narrow peaks. The melting temperatures as indicated by peak positions were 147.5°C. for sample A, 135°C. for sample B and 134°C. for sample C.

Those physical properties of sample A which depend primarily on crystallinity (density, melting temperature, yield stress, and modulus) are significantly higher than values that would be predicted for polyethylene of its high molecular weight crystallized under more usual conditions.

RT polyethylene is useful in applications where high rigidity and unusual toughness are required. In sheet form, specific applications include fender liners, gas tanks and other automobile components, particularly in applications where the stiffness of ABS resins or acetal resin is required but where increased toughness not obtainable with those products is needed. Small gears, fasteners and nuts and bolts can be fabricated for use where high strength and toughness together with low friction, low wear, corrosion resistance and excellent electrical properties are required. The well-known physiological inertness and compatibility of polyethylene makes RT polyethylene valuable for machining into prosthetic parts for surgical uses where the combination of rigidity and toughness characteristic of RT polyethylene are desired in vivo. The primary limitation on applications for RT polyethylene is that the upper use temperature must be below the crystalline melting point. Practically, this is limited to about 100°C. as an upper use temperature limit at atmospheric pressure.

The foregoing detailed description has been given for clarity of understanding only and no unnecessary limitations are to be understood therefrom. The invention is not limited to exact details shown and described for obvious modifications will occur to one skilled in the art.

What is claimed is:

1. Linear polyethylene characterized by ultrahigh molecular weight, as determined from a melt index of essentially zero, indicating substantially no viscous flow above the crystalline melting point, an elastic modulus in the range of 340,000 to 500,000 psi., a tensile impact strength in the range of 140 to 600 ft.lb/in$^2$, a crystalline melting point in the range of 142°–148°C. at atmospheric pressure, as measured by differential thermal analysis, a density of 0.95 to 0.98 grams/cc at 25°C. and a unique crystalline from characterized by the absence of any detectable low-angle X-ray scattering peaks indicative of fold spacings in the range of 50–2000 A and by the presence, as seen in electron microscope photographs of cross sections, of a predominance of crystal spacings of about 10,000 A.

2. The linear polyethylene of claim 1 wherein the elastic modulus is 340,000–460,000 psi. and the tensile impact strength in the range of 140–300 ft.lbs/in$^2$.

3. A rigid tough ultrahigh molecular weight linear polyethylene fabricated article characterized by being malleable and by exhibiting an elastic modulus in the range of 340,000 to 500,000 psi., a tensile impact strength in the range of 140 to 600 ft.lb/in$^2$, a density of 0.95 to 0.98 g/cc at 25°C., a crystalline melting point in the range of 142–148°C., as measured by differential thermal analysis, and a unique crystalline form characterized by the absence of the low-angle X-ray scattering peaks indicating an absence of fold spacings of 50–2000 A normally observed in crystalline polyethylene, and by the presence, as seen in electron microscope photographs of cross sections of a predominance of crystal spacings of about 10,000 A.

4. The fabricated article of claim 3 in the form of a stock rod, capable of being shaped into parts by drawing, machining, rolling, pounding or solid state extrusion.

5. The fabricated article of claim 3 in the form of stock sheet capable of being shaped into articles by drawing machining, rolling or pounding.

6. The fabricated article of claim 3 having a generally cup shape.

* * * * *